(12) United States Patent
West

(10) Patent No.: US 11,325,761 B2
(45) Date of Patent: *May 10, 2022

(54) REUSABLE BOTTLE CAP WITH IDENTIFICATION MARKERS

(71) Applicant: Rennie West, Carson, CA (US)

(72) Inventor: Rennie West, Carson, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/896,325

(22) Filed: Jun. 9, 2020

(65) Prior Publication Data

US 2020/0299039 A1  Sep. 24, 2020

Related U.S. Application Data

(63) Continuation of application No. 15/900,986, filed on Feb. 21, 2018, now Pat. No. 10,710,783, which is a continuation of application No. 14/302,929, filed on Jun. 12, 2014, now Pat. No. 9,934,707.

(60) Provisional application No. 61/837,484, filed on Jun. 20, 2013.

(51) Int. Cl.
*B65D 51/24* (2006.01)
*G09F 3/02* (2006.01)

(52) U.S. Cl.
CPC .... *B65D 51/245* (2013.01); *G09F 2003/0273* (2013.01); *Y02W 30/80* (2015.05)

(58) Field of Classification Search
CPC . G06Q 10/10; G09F 11/02; G09F 2003/0273; B65D 51/245; Y02W 30/80
See application file for complete search history.

(56) References Cited

U.S. PATENT DOCUMENTS 3,695,487 A * 10/1972 Slayton ................... G01F 11/24
                                                        222/430
3,843,007 A * 10/1974 Meyer .................. B65D 55/145
                                                        215/206
7,621,231 B2 * 11/2009 McNeely .................. A61J 7/04
                                                        116/308

* cited by examiner

*Primary Examiner* — Shawn M Braden
(74) *Attorney, Agent, or Firm* — Argus Intellectual Enterprise; Jordan Sworen; Daniel Enea

(57) ABSTRACT

Provided is a reusable container cap adapted to help identify a container belonging to a particular user or to help identify contents of a container when there are several containers similar in appearance. The reusable bottle cap includes a cap housing that encases one or more rotating dials. The dials are stacked inside of the cap housing. A visible surface of each of the dials features letters, numbers, or symbols near its outer edge. The cap housing has a cutout that allows the user to rotate the dials using his or her fingers. When the dials are rotated, a combination of letters, numbers, or symbols are displayed, enabling the user to identify his or her bottle or contents within the bottle. The present invention fits over openings and bottle caps of various sized bottles and containers.

20 Claims, 6 Drawing Sheets

REUSABLE BOTTLE CAP WITH IDENTIFICATION MARKERS

CROSS REFERENCE TO RELATED APPLICATION

This application claims the benefit of U.S. Provisional Application No. 61/837,484 filed on Jun. 20, 2013, U.S. Nonprovisional application. Ser. No. 14/302,929 filed on Jun. 12, 2014, and U.S. Nonprovisional application Ser. No. 15/900,986 filed on Feb. 21, 2018. The above identified patent application is herein incorporated by reference in its entirety to provide continuity of disclosure.

BACKGROUND OF THE INVENTION

The present invention relates to a reusable bottle cap adapted for identifying the owner or contents of a bottle or a container. More specifically, the present invention describes a bottle cap with one or more dials that help individuals identify their beverage bottle. The dials feature various indicia such as characters, letters, numbers, or symbols that are displayed through a window cutout on top or side of the cap. A user can turn the dials to display a particular combination of, numbers, or symbols. The bottle cap is designed to fit a valve or an opening for any size beverage bottle opening, thereby allowing users to use the present invention with a wide variety of beverage bottles or containers. The bottle cap helps distinguish a beverage bottle from another beverage bottle similar in appearance, which prevents confusion and spread of germs.

Many individuals drink water, soft drinks, and other beverages from disposable plastic bottles. Disposable plastic beverage bottles tend to be similar in appearance to other disposable plastic bottles. Particularly when individuals are drinking the same beverage in a social gathering, it is often impossible to distinguish one bottle from the other. When individuals put their drinks down and cannot remember which bottle is theirs, half-consumed drinks are often tossed out to avoid unintentionally drinking another person's drink. In an effort to identify their beverage bottle, some individuals attempt to label their bottles with markers, but marker ink can be quickly wiped off by the condensation that forms on the bottle's surface. Other individuals choose to rip off the beverage's label in hopes of identifying their bottles, but this does not work if multiple individuals remove the label. Similar bottle appearances often cause individuals to inadvertently drink from the wrong bottle, which can lead to spread of bacteria and germs.

The present invention is a bottle cap designed to assist individuals in identifying their beverage bottles, without the need to mark the bottle or alter the appearance of the bottle label. Individuals can use the present invention to display his or her initials or a particular combination of letters, numbers, or symbols, which is easy to read. The present invention helps to prevent individuals from unintentionally drinking out of the wrong beverage bottle by helping the user to easily identify his or her bottle. Additionally, the present invention can be used to identify the contents in a bottle or container. For instance, a user having a special dietary restrictions or allergies can utilize the present invention to display identifying information about contents of the bottle to avoid inadvertently consuming the contents. The present invention is reusable and may be used with various types of beverage bottles having a valve or opening, allowing users to use the bottle cap with a different beverage bottle. Further, the present invention can help prevent individuals from transmitting germs or from drinking out of a beverage bottle containing liquids that could cause hypersensitive reactions to certain individuals.

Existing bottle cap devices require a user to make markings on a cap or remember a designed marking on a bottle or a container. These devices, however, fail to provide a reusable bottle cap device adapted to be positioned on a bottle having an opening or valve, and that further includes letters, numbers, or symbols disposed on one or more dials, which improves the identification of beverage bottles similar in appearance. In further comparison to the known art, the present invention does not require a user to make a marking with a writing utensil or remember a designated code or design on a bottle thereby providing more convenience in a solution that improves the identification of beverage bottles similar in appearance. Thus, the present invention addresses the prominent shortcomings relating to bottle caps that commonly reside in the art and provides a novel solution relating to identifying one bottle from another.

The present invention relates to a beverage bottle cap adapted to display identifying information, allowing a user to easily identify his or her bottle. The bottle cap comprises one or more dials having letters, numbers, or symbols printed along the outer edge of its visible surface. The dials are stacked on top of the other and enclosed in a bottle cap housing, which comprises at least one cutout on the top or the side of the housing. A user can access the edge of the dials through the cutout on the side of the housing and can turn the dials using his or her thumb or finger until a desired combination of letters, numbers, and symbols is displayed on the cap. The present invention can be used with various sized valves or fit around a bottle cap on a beverage bottle.

In light of the devices disclosed in the known art, it is submitted that the present invention substantially diverges in design elements and methods from the known art and consequently it is clear that there is a need in the art for an improvement for reusable bottle caps. In this regard the instant invention substantially fulfills these needs.

SUMMARY OF THE INVENTION

In view of the foregoing disadvantages inherent in the known types of reusable bottle caps now present in the known art, the present invention provides a new reusable bottle cap wherein the same can be utilized to help identify a user and contents of a container when there are several containers similar in appearance.

It is an object of the present invention to provide a reusable bottle cap device having a bottle cap housing and one or more rotatable dials that display letters, numbers, or symbols in order to help a user to identify his or her bottle or beverage container, or the contents thereof.

It is another object of the present invention to provide a reusable bottle cap with a bottle cap housing and one or more rotatable dials to display a unique visual indicator to identify the user or contents of a bottle.

It is yet another object of the present invention is to provide a reusable bottle cap device configured for use with various bottles or containers having an opening or valve.

Yet another object of the present invention is to provide a reusable bottle cap device configured to frictionally fit over an existing bottle cap.

Yet another object of the present invention is to provide a reusable bottle cap device that allows the bottle cap to be marked without the use of a writing utensil or other tools used for marking.

Yet another object of the present invention is to provide a reusable bottle cap device that is washable and reusable.

It is therefore an object of the present invention to provide a new and improved reusable bottle cap device that has all of the advantages of the known art and none of the disadvantages.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
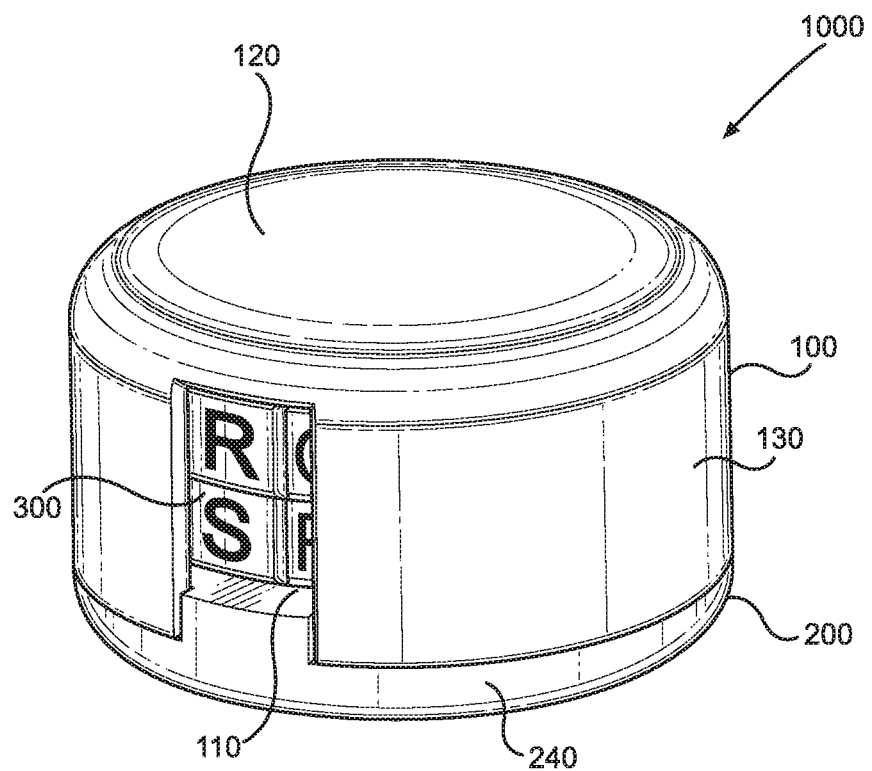
FIG. 1 shows a perspective view of an embodiment of the reusable bottle cap.

Reference is made herein to the attached drawings. Like reference numerals are used throughout the drawings to depict like or similar elements of the reusable bottle cap. For the purposes of presenting a brief and clear description of the present invention, the preferred embodiment will be discussed as used for securing to a neck of a bottle such that the indicia of the dials are displayed through a cutout window. The figures are intended for representative purposes only and should not be considered to be limiting in any respect.

Reference will now be made in detail to the exemplary embodiment (s) of the invention. References to "one embodiment," "at least one embodiment," "an embodiment," "one example," "an example," "for example," and so on indicate that the embodiment(s) or example(s) may include a feature, structure, characteristic, property, element, or limitation but that not every embodiment or example necessarily includes that feature, structure, characteristic, property, element, or limitation. Further, repeated use of the phrase "in an embodiment", "first embodiment", "second embodiment", or "third embodiment" does not necessarily refer to the same embodiment.

Figure 2:
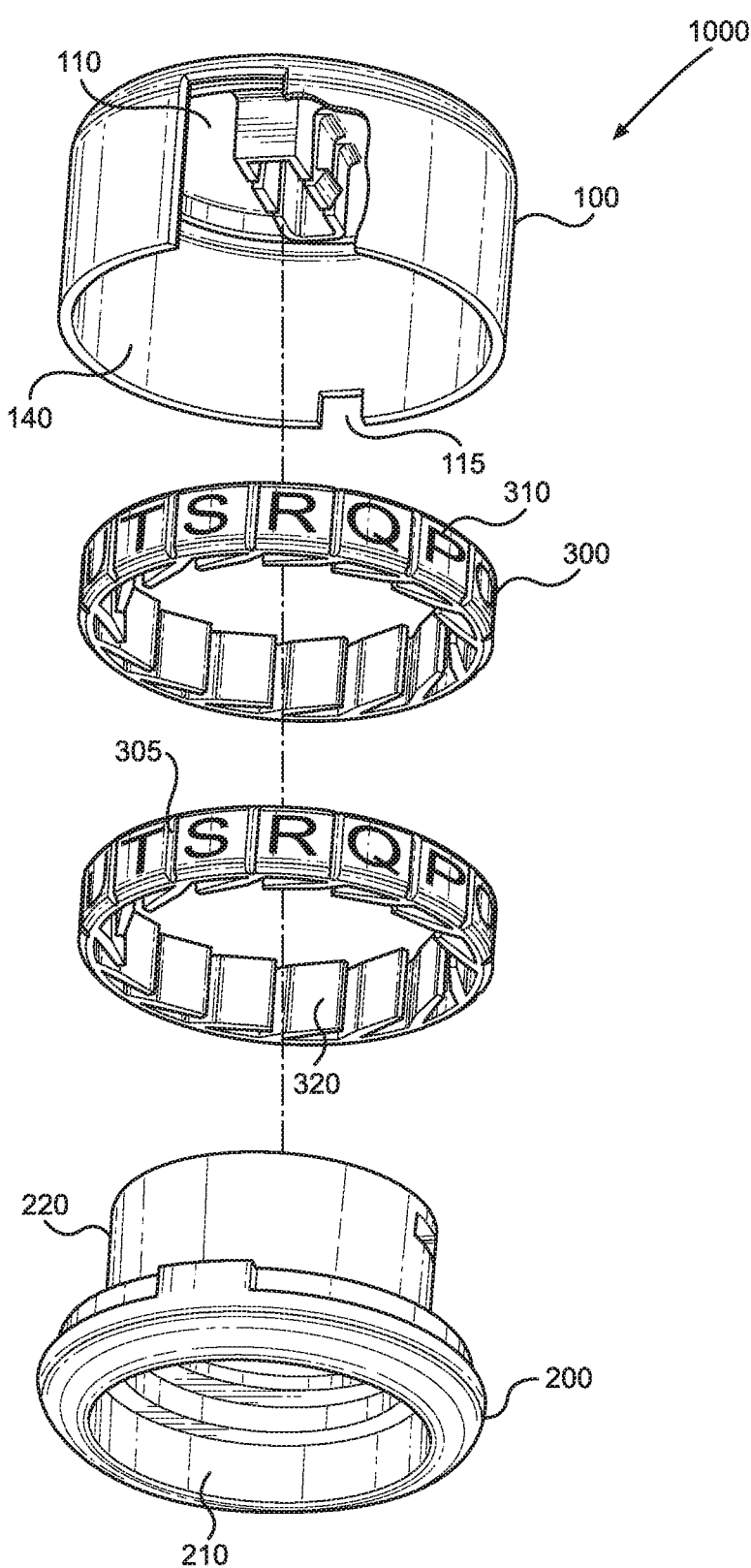
FIG. 2 shows an exploded view of an embodiment of the reusable bottle cap.

Referring now to FIGS. 1 and 2, there is shown a perspective view and an exploded view of an embodiment of the reusable bottle cap, respectively. The reusable bottle cap 1000 comprises a cap housing 100 secured to a valve housing 200 that together enclose one or more rotating dials 300. Each dial comprises an exterior side having one or more indicia, such as characters, letters, numbers, or symbols. The cap housing 100 has a window cutout 110 that allows the user to rotate the dials 300 using his or her fingers. When the dials 300 are rotated, a combination of letters, numbers, or symbols are displayed through the window cutout 110, enabling the user to view a character on the exterior side in order to identify his or her bottle or contents within the bottle.

In the illustrated embodiment, the cap housing 100 is generally cylindrical in shape, although other shapes may be used in alternate embodiments. In the illustrated embodiment, the cap housing 100 comprises an exterior upper side 120, an open lower end 140, a sidewall 130 extending between the exterior upper side 120 and lower end 140, and a hollow interior. In the illustrated embodiment, the upper side 120 extends continuously along any diameter thereof, forming an entirely closed surface. The open lower end 140 receives the dials 300 and valve housing 200 therein. In some embodiments, the cap housing 100 is formed of a single piece of rigid material, such as plastic. The edge formed between the upper side 120 and the sidewall 130 is rounded to provide comfort to the user when removing and applying the reusable bottle cap 1000 to a beverage bottle.

In the illustrated embodiment of the present invention, the cap housing 100 encloses a pair of rotatable dials 300, each rotatable dial having a visible surface when viewed through the window cutout 110. Each of the dials 300 are ring shaped and are composed of a rigid material, such as plastic. The dials 300 are mounted around the valve housing 200 and disposed within the hollow interior of the cap housing 100. In the illustrated embodiment, the first dial is positioned above the second dial. When the dials 300 are stacked on top of each other, the visible surfaces collectively form a substantially flat surface. The dials 300 are axially aligned with each other, the cap housing 100, and the valve housing 200.

The dials include a plurality of indicia 310 thereon such as characters, letters, numbers, symbols, and/or blank spaces. The indicia are disposed around the exterior side of the dials. In the illustrated embodiment, the exterior sides are configured so that a user can display a combination of two letters on the exterior sides, wherein each character is aligned in a stacked configuration. Each dial 300 is individually rotatable and settable so that an individual character or a set of characters may be selected. The dials 300 may be knurled around its perimeter edge, giving tactile feedback, and providing more control to a user when rotating the dials. In the illustrated embodiment, the exterior sides of the dial comprise a plurality of tiles disposed entirely therearound, wherein each tile includes a single indicium thereon. Adjacent tiles are separated by a fingerhold recess 305 adapted to provide selective gripping and rotation of the dial. The fingerhold recess 305 is positioned between each character to allow a user to easily grasp and rotate the dial. The fingerhold recess 305 comprises a channel extending between an upper and lower end of the dial 300.

In the illustrated embodiment, ratchet teeth 320 extend from an interior side of the dial 300 and are configured to frictionally engage the valve housing 200. The ratchet teeth 320 are disposed on the interior side opposing a character or tile. The ratchet teeth 320 are angled away from the interior surface of the dial in a uniform direction to provide sufficient force against the valve housing 200 such that when a user completes rotating the dial 300 to an end use position, the dial 300 will cease rotating and remain locked in position until the user reapplies force to rotate the dial 300 again. In the illustrated embodiment, each ratchet tooth 320 extends entirely from an upper edge to a lower edge of the dial 300. However, in some embodiments, the ratchet tooth 320 only extends along the upper edge of the dial (see FIG. 7). In the illustrated embodiment, a pawl (see FIG. 3, 290) extends from the valve housing 200 to only allow single direction rotation of each dial. The pawl extends the length of the lateral sidewall of the housing 200. In operation, the ratchet teeth are configured to engage with the pawl of the valve housing and provide one-way rotation of the dial. Each tooth extends from an interior side of the dial at a uniform angle. Further, in the illustrated embodiment, the ratchet teeth are adapted to engage the pawl to display only a single indicium through the window cutout.

The window cutout 110 of the housing 100 of the illustrated embodiment is rectangular in shape and extends from a top edge of the cap housing 100 to an opposing lower edge of the cap housing 100. In alternate embodiments, the window cutout comprises any suitable shape configured to display characters on the dials, such as a wedge shape. The window cutout 110 displays the visible surfaces of the dials 300. As such, the window cutout 110 is adapted to display one of the characters from each of the visible surface of the rotatable dials at one time. In alternate embodiments, the window cutout is adapted to display more than one characters on a single dial at a time. The window cutout 110 is disposed perpendicular to the upper side 120 of the cap housing 100 and displays a combination of characters on the visible surfaces of the dials 300, while simultaneously allowing a user to access the fingerhold recesses 305 of the dials. When a desired combination of the characters is positioned in alignment with the window cutout 110, the combination of the characters serves as a visual indicator to the user in facilitating identification of his or her bottle. The dials remain in place until the user manipulates the dials at a later time to display a new combination of characters.

Figure 3:
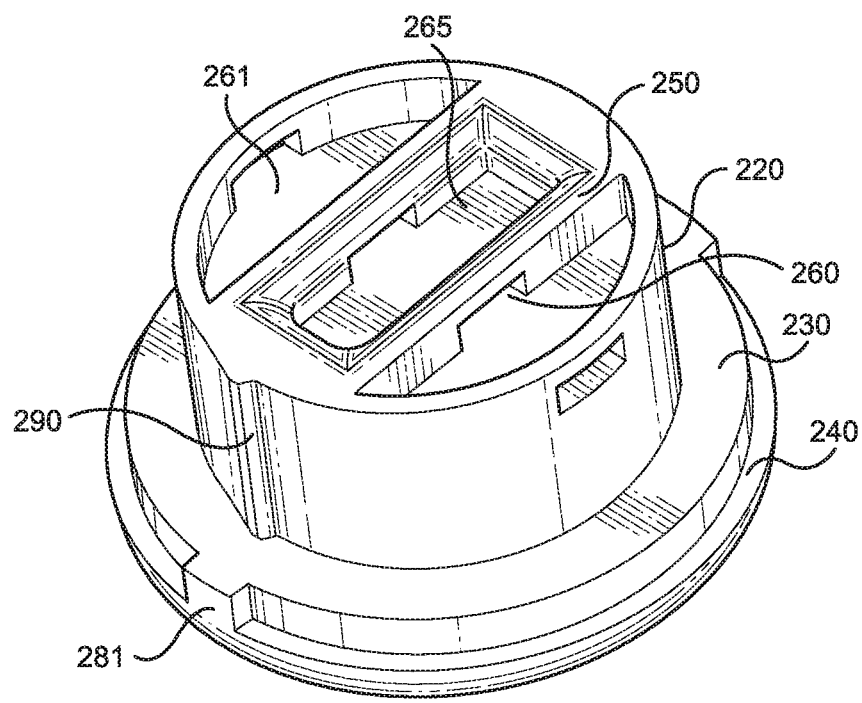
FIG. 3 shows a perspective view of a rear side of the valve housing of the reusable bottle cap.
Figure 4:
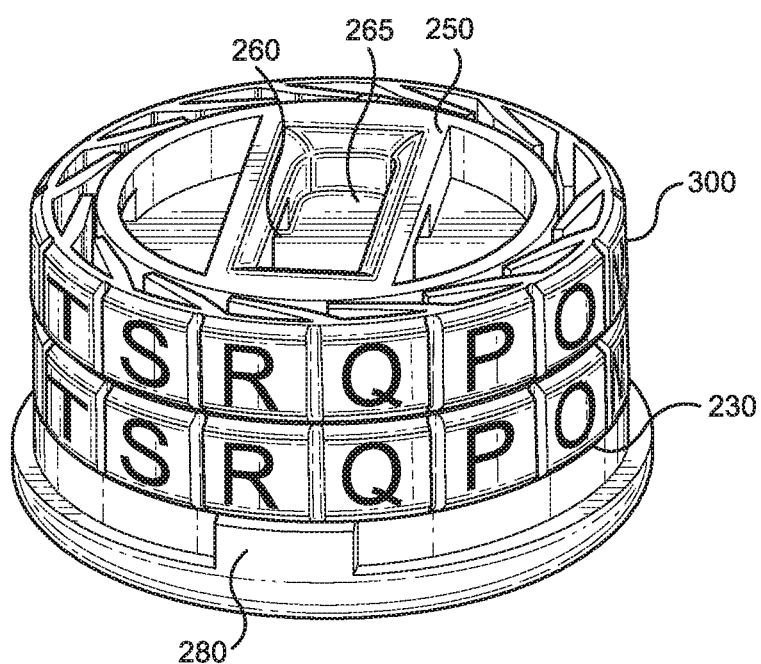
FIG. 4 shows a perspective view of a pair of dials mounted to the valve housing of an embodiment of the reusable bottle cap.

Referring now to FIGS. 3 and 4, there is shown a perspective view of a rear side of the valve housing of the reusable bottle cap and a perspective view of a pair of dials mounted to the valve housing of an embodiment of the reusable bottle cap, respectively. In the illustrated embodiment, the valve housing 200 is substantially cylindrical in shape and comprises a rigid material, such as plastic or other suitable materials. The dial 300 is positioned within the cap housing and is seated on an upper side of the valve housing 200 wherein the dial 300 encircles a lateral sidewall 220 of the value housing 200 and is adapted to rotate thereabout. The lateral sidewall 220 extends towards the upper surface of the cap housing. The lateral sidewall of the valve housing 200 fits tightly into the hollow interior of the cap housing so that the dials 300 are secured in place and only move rotationally when in use.

In the illustrated embodiment, the valve housing 200 comprises a first annular shoulder 230 extending perpendicular from a lower end of the lateral sidewall 220, wherein the first dial 300 rests thereupon. The lateral sidewall 220 comprises a diameter smaller than a diameter of the dial 300. In this way, the first dial fits around the lateral sidewall 220 and rests on the first annular shoulder 230. The second dial rests directly above the first dial and around the lateral sidewall 220. In other embodiments, three or more dials are stacked and disposed around the lateral sidewall 220. In some embodiments, the reusable bottle cap only comprises one dial. In the illustrated embodiment, the lateral sidewall 220 comprises a smooth surface and a circular cross section.

A second annular shoulder 240 is disposed beneath and beyond the first annular shoulder 230. The second annular shoulder 240 comprises a diameter larger than the diameter of the first annular shoulder 230. The second annular shoulder 240 forms an exterior of the reusable bottle cap. In some embodiments, the second annular shoulder 240 forms a lowermost edge of the reusable bottle cap. The lower side of the cap housing is seated upon the second annular shoulder 240 of the valve housing (as seen in FIGS. 1 and 5), such that the exterior of the cap housing and the exterior of the valve housing 200 form a continuous surface.

In the illustrated embodiment, the valve and cap housing are secured to one another via an interlocking fastener. The underside of the cap housing comprises a protruding member 275 (as seen in FIG. 2) that fits within a recessed member 265 disposed on the upper surface 250 of the valve housing 200. The protruding member and recessed member comprise a close tolerance such that minimal space, if any, exists between an adjacent wall of the recessed member 265 and the protruding member 275. The recessed member 265 further comprises a pair of opposing grooves 260 disposed on opposing walls that each receive an aligned overhang member 270 disposed on opposing sides of the protruding member 275. Each overhang member 270 terminates with a latch that is disposed within the groove thereby preventing movement or separations between the cap housing and the valve housing. In this way, the cap housing 100 is secured to the valve housing 200 through the interlocking groove and overhang member. In the illustrated embodiment, the upper surface of the valve housing 200 comprises additional recesses 261 disposed on opposing sides of the recessed member. In this way, the additional recesses 261 serve to reduce the overall weight and bulkiness of the reusable bottle cap.

To further maintain alignment of the cap housing to the valve housing when in use to prevent the housings rotating relative to each other, the reusable bottle cap comprises an interlocking tab assembly. In the illustrated embodiment, the tab assembly comprises a first tab 280 extending upward from the second annular shoulder 240 and terminates at the first annular shoulder 230, such that the uppermost surface of the first tab 280 is level with the uppermost surface of the first annular shoulder 230. In some embodiments, a second tab 281 extends from an opposing side of the second annular shoulder 240 similarly to the first tab 280. The window cutout is aligned with the first tab and a second cutout 115 (seen on FIG. 2) on an opposite side of the window cutout is aligned with the second tab 281. In this way, the tab and cutout engagement prevent rotation of the cap housing relative to the valve housing 200. In the illustrated embodiment, a width of the second tab 281 and second cutout is smaller than a width of the first tab 280 and window cutout.

Figure 5:
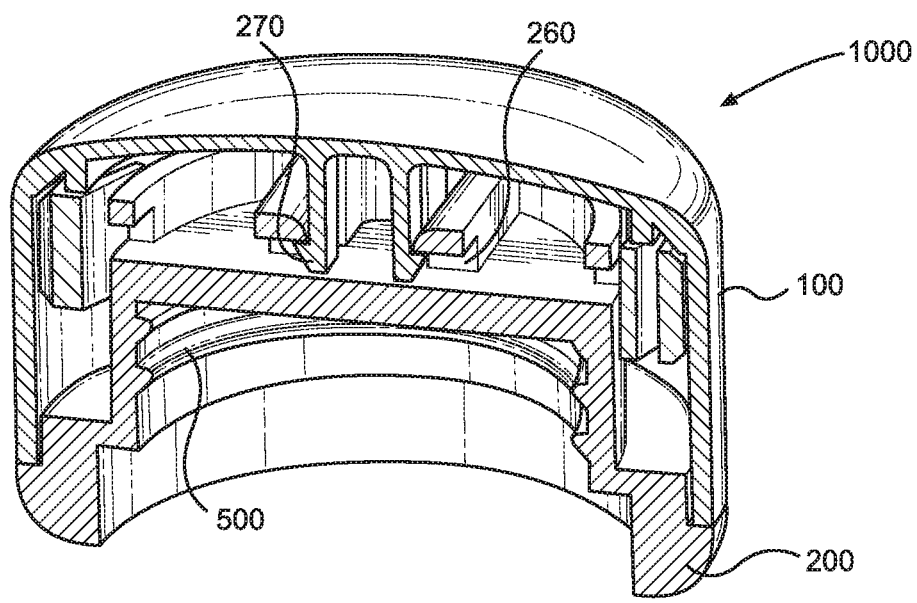
FIG. 5 shows a cross-sectional view of an embodiment of the reusable bottle cap.

Referring now to FIG. 5, there is shown a cross sectional view of an embodiment of the reusable bottle cap. In the illustrated embodiment, the valve housing 200 is configured to seal the opening of the container or bottle when secured thereto. When the reusable bottle cap 1000 is in use, a threaded engagement 500 creates a seal to prevent any debris from touching the valve or interior of the valve housing 200. The lower side of the valve housing 200 serves as a barrier to the hollow interior of the cap housing, wherein the rotation of the dial is isolated and independent from the lower side of the valve housing such that securement of the value housing to the beverage container is unrelated to the rotation of the dial. In the illustrated embodiment, an interior of the lower side of the valve housing 200 is threaded 500 in order to twist onto a threaded bottle valve to replace the existing bottle cap. In alternate embodiments, the lower side comprises an alternate fastener, such as seen in FIGS. 7 and 9.

The interior of the valve housing is hollow so as to receive a mount of a bottle therein. In some embodiments, the valve housing 200 secures directly over an existing beverage bottle cap, wherein other embodiments the valve housing secures directly to the valve of an existing beverage bottle and forms a seal therewith to prevent any liquid from spilling from the bottle. In the illustrated embodiment, the reusable bottle cap 1000 provides a complete seal around the valve or mouth of the bottle as to prevent debris or germs from coming into contact with the valve or prevent any contents of the bottle from spilling.

Figure 6:
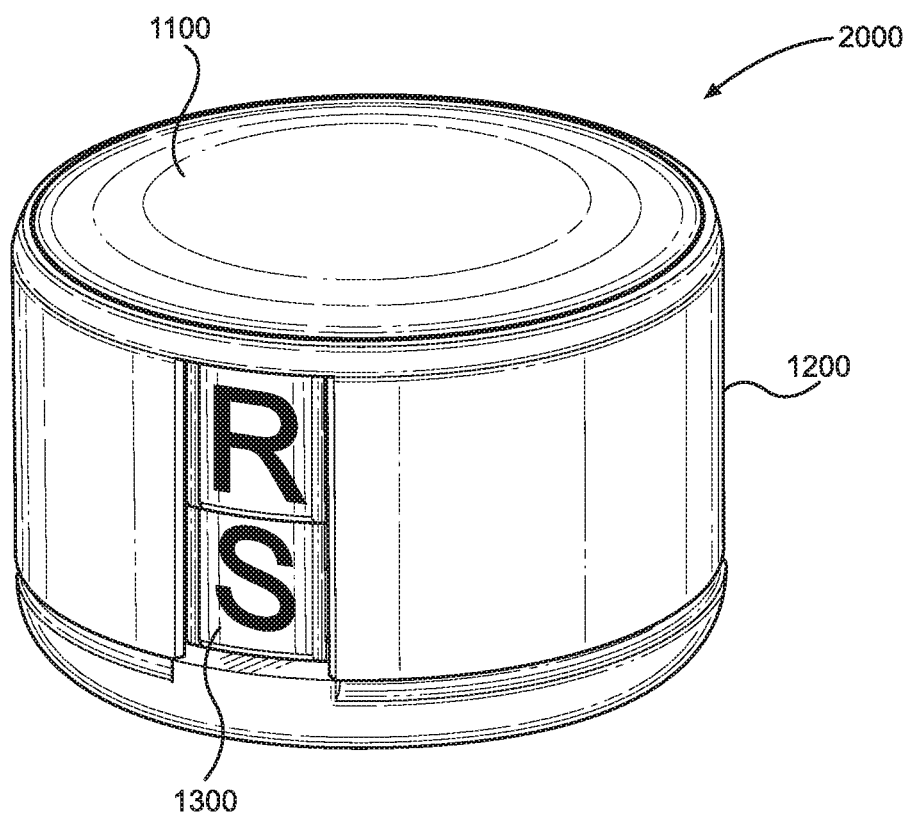
FIG. 6 shows a perspective view of another embodiment of the reusable bottle cap.
Figure 7:
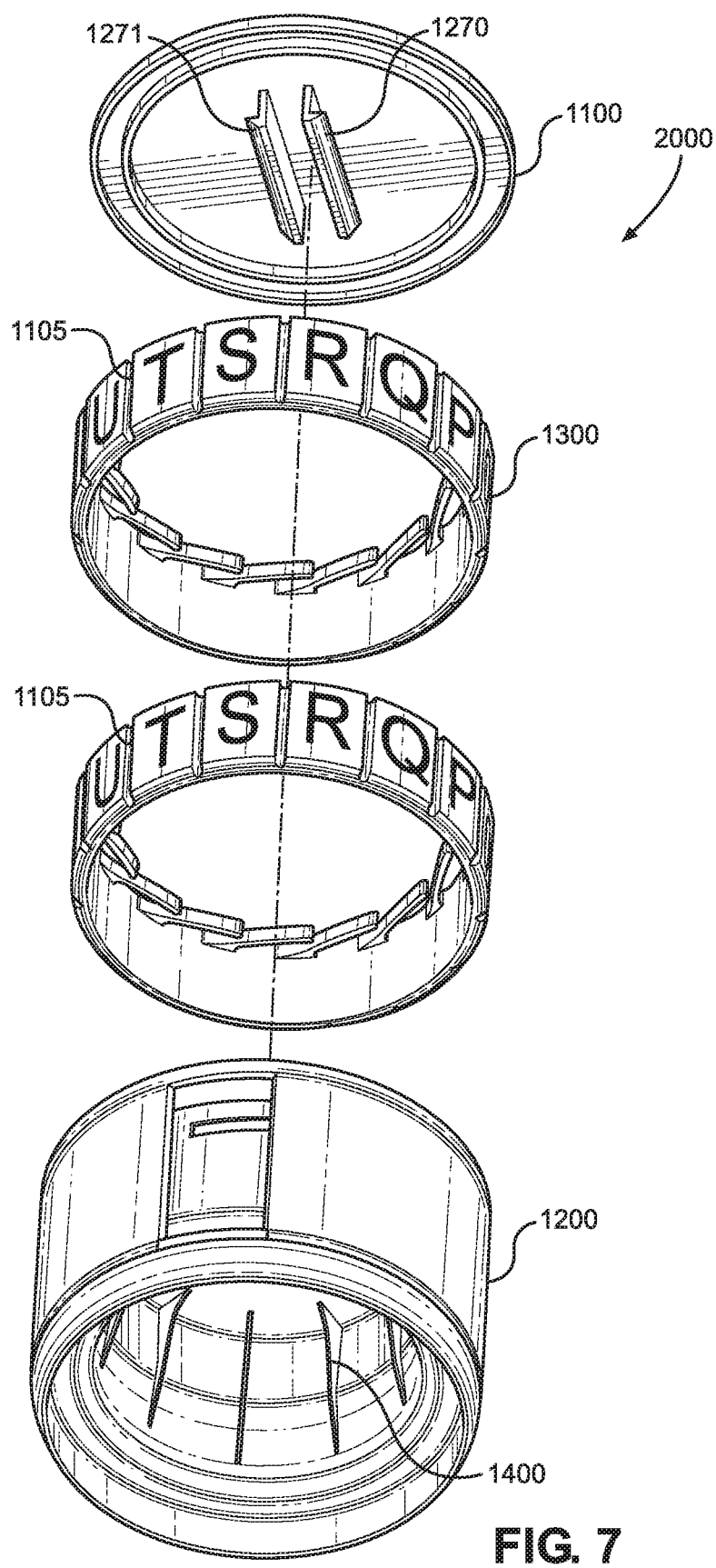
FIG. 7 shows an exploded view of another embodiment of the reusable bottle cap.

Referring now to FIGS. 6 and 7, there is shown a perspective view and an exploded view of another embodiment of the reusable bottle cap. In the shown alternate embodiment, the reusable bottle cap 2000 comprises a cap housing 1100 affixed to a valve housing 1200, wherein one or more dials 1300 are secured therebetween. The cap housing 1100 forms the upper surface of the reusable bottle cap 2000 and does not include a sidewall extending around the valve housing. The underside of the cap housing 1100 comprises a pair of overhang members 1270 that are secured within grooves 1260 of a recessed member 1265 (seen in FIGS. 8 and 9) disposed on the top side of the valve housing 1200. The pair of overhang members 1270 extend parallel to one another and downward from the underside of the cap housing 1100. Each overhang member 1270 terminates with a latch 1271 that is disposed within the groove. The overhang members 1270 are disposed central on the cap housing 1100. In this way, the cap housing 1100 remains secured to the valve housing 1200. In the illustrated embodiment, the cap housing 1100 is positioned above the dials 1300 disposed within the valve housing 1200.

Figure 8:
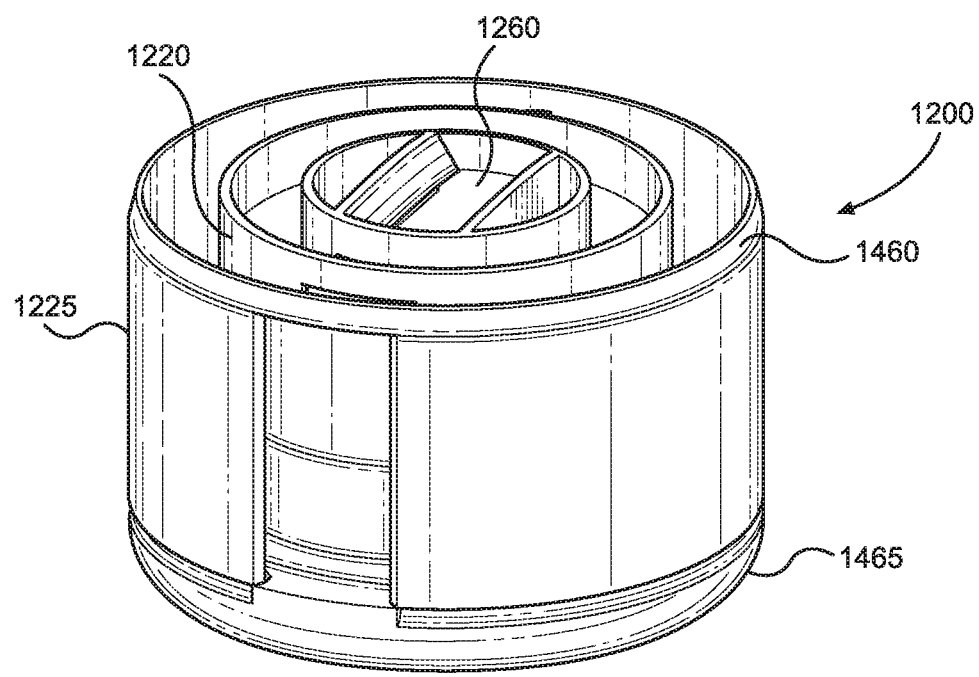
FIG. 8 shows a perspective view of the valve housing of the reusable bottle cap.
Figure 9:
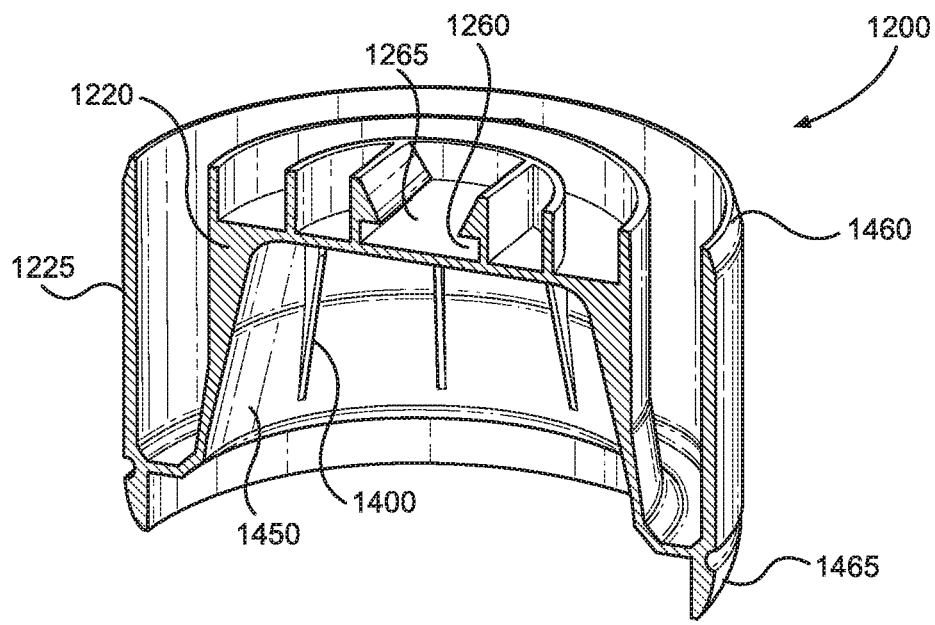
FIG. 9 shows a cross-sectional view of the valve housing of the reusable bottle cap.

Referring now to FIGS. 8 and 9, there is shown a perspective view and a cross sectional view of the valve housing of another embodiment of the reusable bottle cap. In the illustrated embodiment, the valve housing 1200 comprises an internal lateral sidewall 1220 and an exterior lateral sidewall 1225, wherein the dials are seated therebetween. The exterior lateral sidewall 1225 comprises the window cutout 1110 to view the characters on the dials. In the illustrated embodiment, the internal and exterior lateral sidewalls 1220, 1225 are parallel to one another and extend upward toward the cap housing 1100. The sidewalls 1220, 1225 terminate at a same height. The exterior of the cap housing is continuous with the exterior lateral sidewall 1225, forming a smooth outer surface, as seen in FIG. 6.

In the illustrated embodiment, the lower side of the valve housing 1200 is configured to slide onto the valve of a bottle or over the existing bottle cap. A plurality of slides 1400 extend between an interior sidewall 1450 of the valve housing 1200 and the underside thereof. Each slide 1400 is tapered such that a width of the slide at the lower end 1465 of the valve housing 1200 increases towards the upper end 1460. Each slide 1400 is distributed a fixed distance from one another along the interior sidewall 1450 of the valve housing 1200. The slides 1400 are configured to work in unison to secure the reusable bottle cap to the existing bottle cap. The slides 1400 are designed to fit around existing bottle caps of differing diameters. The valve housing 1200 is placed over the existing bottle cap and forms a friction fit with the slides 1400. In some embodiments, the slides are composed of a silicon or a rubber-like material that can create a seal or otherwise form around the existing bottle cap. In other embodiments, the slides 1400 are rigid and composed of the same material as the valve housing. To use the reusable bottle cap 2000 over the existing bottle cap or valve, the user would slide the reusable bottle cap 2000 on and off therefrom.

In the present embodiment, the hollow interior of the valve housing 200, 1200 is constructed to accept an opening of a bottle or existing bottle cap without interfering with the dials 300, 1300 positioned within the hollow interior of the cap housing 100 or, in some embodiments, the interior between the exterior and interior lateral sidewalls of the valve housing 1200. Furthermore, the threaded interior sidewall of the valve housing 200 is adapted to twist onto a threaded opening of a beverage bottle to securely close the bottle, preventing the contents of the bottle from spilling.

To turn the dials a user would access the dial edges through the window cutout disposed on the lateral surface. The user would then utilize his or her thumb or finger to push the edges of the dials through the side of the window cutout in a clockwise or counterclockwise direction. When a desired combination of characters has been selected on visible surfaces the user can cease rotating the dials. The ratchet teeth semi-lock the dials in place and prevent the user from inadvertently rotating the dial while using the device of the present invention.

In yet other embodiments, the characters may be selected using other methods or processes, so as to provide a plurality of dials that can be arranged relative to each other so that the combination of various characters help the user identify his or her beverage bottle. Embodiments of the bottle cap 1000 can also be configured to provide a textual combination that is easy for a user to remember. For example, a user may select a combination that provides two letters of their initials. The combination of letters, numbers, symbols, and/or blank spaces can help the user to remember the textual combination to identify his or her beverage bottle. Although some combinations of certain characters may be seemingly unrelated, each letter, number, symbol, and/or blank space may have individual significance to help the user remember and retain the combination to identify the bottle. Moreover, seemingly unrelated combination of characters provide reassurance against other users who may attempt to claim the beverage bottle. As a result, using one or more characters as the combination to identify the bottle can provide an easier way to identify his or her bottle. The bottle cap 1000 of the present invention includes a hollow cavity adapted to receive an opening or a valve of a bottle or container. The hollow cavity of the bottle cap 1000 may be adapted to fit onto a threaded opening for a twist opening or closure. Additionally, the hollow cavity of the bottle cap 1000 may be adapted to slide on or off of a valve or opening of a bottle or container. The bottle cap 1000 is suitable for repeated use and can be washed after each use.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A reusable bottle cap, comprising:
   a cap housing affixed to a valve housing, wherein the cap housing forms an upper side of the reusable bottle cap and a lower side of the valve housing is configured to removably secure to a bottle;
   a dial rotatably enclosed between the cap housing and the valve housing, wherein the dial comprises an exterior side having indicia thereon, wherein the indicia is selected from numbers, characters, or symbols;
   wherein an exterior side of the dial is viewable and rotatable through a window cutout, the window cutout disposed on an exterior sidewall of the valve housing;
   wherein rotation of the dial is isolated and independent from the lower side of the valve housing, such that securement of the value housing to the bottle is unrelated to the rotation of the dial.

2. The reusable bottle cap of claim 1, wherein a periphery of a lower side of the cap housing rests on a periphery of an upper side of the valve housing, forming a continuous exterior surface.

3. The reusable bottle cap of claim 1, wherein the valve housing comprises a lateral sidewall extending upward toward the upper side and a first annular shoulder extending perpendicularly from the lower side of the valve housing, wherein the dial is seated on the first annular shoulder and encircles the lateral sidewall.

4. The reusable bottle cap of claim 3, further comprising a second annular shoulder adjacent to and encircling the first annular shoulder, wherein a lower side of the cap housing is seated thereon.

5. The reusable bottle cap of claim 4, wherein the lateral sidewall comprising a smaller diameter than the first annular shoulder and the first annular shoulder comprising a smaller diameter than the second annular shoulder.

6. The reusable bottle cap of claim 4, wherein a lower portion of the second annular shoulder forms an exterior of the reusable bottle cap device.

7. The reusable bottle cap of claim 6, wherein the second annular shoulder forms a lowermost edge of the reusable bottle cap device.

8. The reusable bottle cap of claim 1, wherein the upper side of the cap housing is entirely closed and extends continuously along any diameter thereof, wherein the diameter extends across a perimeter of the upper side.

9. The reusable bottle cap of claim 1, wherein the valve housing is configured to seal an opening of the bottle when secured thereto and in all configurations of the dial.

10. The reusable bottle cap of claim 1, wherein the dial comprises a first dial that is seated directly on a first annular shoulder of the valve housing and a second dial seated on the first dial in a stacked configuration.

11. The reusable bottle cap of claim 1, wherein an interior sidewall of the lower side of the valve housing is configured to threadedly secure to an opening of the bottle.

12. The reusable bottle cap of claim 4, further comprising a tab assembly including a first tab extending upward from the second annular shoulder and terminating at the first annular shoulder, wherein the window cutout receives the first tab to prevent rotation of the cap housing relative to the valve housing.

13. The reusable bottle cap of claim 1, wherein the cap housing is secured to the valve housing via an interlocking fastener; the interlocking fastener comprising a pair of overhang members extending from an underside of the cap housing, each overhang member terminating with a latch, each latch disposed within a groove within a recessed member on an upper surface of the valve housing.

14. The reusable bottle cap of claim 13, wherein the overhang members are parallel to one another.

15. The reusable bottle cap of claim 1, wherein the dial is seated between an interior lateral sidewall and an exterior lateral sidewall of the valve housing, wherein the sidewalls are parallel to one another and terminate at a same height.

16. The reusable bottle cap of claim 1, wherein the dial comprises a first dial that rests on an upper side of the valve housing and a second dial rests on the first dial in a stacked configuration.

17. The reusable bottle cap of claim 1, wherein the exterior side of the dial comprise tiles disposed entirely therearound, wherein each tile comprise a single indicia thereon and wherein adjacent tiles are separated by a fingerhold recess adapted to provide selective gripping and rotation of the dial.

18. The reusable bottle cap of claim 1, further comprising a plurality of ratchet teeth extending from an interior side of the dial, the ratchet teeth are configured to engage with a pawl of the valve housing and provide one-way rotation of the dial;
   wherein each ratchet tooth of the plurality of ratchet teeth extends from an interior side of the dial at a uniform angle.

19. The reusable bottle cap of claim 1, wherein the lower side of the valve housing is configured to secure around a bottle cap secured to the bottle.

20. The reusable bottle cap of claim 1, wherein the valve housing further comprises:
   a plurality of slides on the lower side thereof configured to secure the reusable bottle cap to an existing bottle cap of the bottle;
   wherein each slide extends from an interior sidewall and an underside of the valve housing;
   wherein each slide is tapered such that a width of a lower end of the slide increases towards an upper end thereof;
   wherein each slide is distributed at a fixed distance from adjacent slides along the lower side.

* * * * *